(12) United States Patent
Tarter

(10) Patent No.: US 10,602,882 B1
(45) Date of Patent: Mar. 31, 2020

(54) CONSTRUCTIVE ARRANGEMENT APPLIED TO A COOKED AND/OR PRECOOKED MEAT SHREDDING MACHINE

(71) Applicant: Matteo Giovanni Tarter, São Paulo (BR)

(72) Inventor: Matteo Giovanni Tarter, São Paulo (BR)

( * ) Notice: Subject to any disclaimer, the term of this patent is extended or adjusted under 35 U.S.C. 154(b) by 0 days.

(21) Appl. No.: 16/508,892

(22) Filed: Jul. 11, 2019

(51) Int. Cl.
| | |
|---|---|
| A47J 43/00 | (2006.01) |
| A47J 43/25 | (2006.01) |
| A22C 21/00 | (2006.01) |
| B02C 23/04 | (2006.01) |
| B02C 23/02 | (2006.01) |
| B02C 4/30 | (2006.01) |

(52) U.S. Cl.
CPC .......... *A47J 43/25* (2013.01); *A22C 21/0023* (2013.01); *B02C 4/30* (2013.01); *B02C 23/02* (2013.01); *B02C 23/04* (2013.01)

(58) Field of Classification Search
CPC .................................. A47J 43/25; A47J 43/00
USPC ......................................................... 452/149
See application file for complete search history.

(56) References Cited

U.S. PATENT DOCUMENTS

| | | | | | |
|---|---|---|---|---|---|
| 2,403,910 | A | * | 7/1946 | Christiansen | A22C 25/20 241/24.26 |
| 4,058,872 | A | * | 11/1977 | Henry | A22B 5/0058 452/198 |
| 5,342,236 | A | * | 8/1994 | Repisky | B26D 1/24 452/142 |
| 7,740,528 | B1 | * | 6/2010 | Gagliardi, Jr. | A22C 11/001 452/149 |
| 7,988,541 | B1 | * | 8/2011 | Zehrer | A22C 17/0026 452/149 |

* cited by examiner

*Primary Examiner* — Richard T Price, Jr.
(74) *Attorney, Agent, or Firm* — Scott Houtteman; Houtteman Law LLC

(57) ABSTRACT

An equipment for shredding various meats, cooked and/or pre-cooked, deboned, whether of ox, chicken or other animals, equipped with a meat striping system to shred it without crushing it, with simple and resistant structure, motorized and coupled directly to the motor shaft for productivity gain, and also, with components of modern and functional design, which provide efficiency and safety for the operator during handling. The present meat defroster is constituted by a rectangular-shaped bench (1), provided with four legs, with motor and shaft mounted horizontally.

2 Claims, 11 Drawing Sheets

CONSTRUCTIVE ARRANGEMENT APPLIED TO A COOKED AND/OR PRECOOKED MEAT SHREDDING MACHINE

BRIEF SUMMARY OF THE INVENTION

This description refers to a piece of equipment designed to shred various deboned, cooked and/or pre-cooked meats, either beef, chicken or other animals, equipped with a meat stripping system to shred without grinding it, whose operation is motorized for gain of productivity.

This invention is in the field of kitchen equipment for preparation of food products.

As is known to those skilled in the art, there are various meat stripping equipment on the market, however, none of them, without exception, has the innovative features claimed in this application.

In research conducted on the patent basis, some equipment was identified in the state of the art which was developed to shred meats, some already in the public domain, but none of them with the combination of the benefits provided by this application. To support this claim, the following describes documents found on the Brazilian patent databases, American and European, comparing them with this new provision claimed.

In the Brazilian Patent Office database, the following patent applications stand out: a) Patent application 0201470-0, filed on Apr. 12, 2002, referred to as Cooked Chicken Shredder, Manual or Electric, describes an equipment equipped with a four-legged chassis, where a claw is fixed and a horizontal shaft with a crank is mounted. The claw's teeth are sharp, fixed and have a triangular shape, through which pass a set of rods mounted on the shaft of the shredder. At the top of the equipment is a kind of hinged chute, which is raised to clean the teeth after use. A motor can also be coupled to the equipment, but its structure is not suitable for motorization, making it even more dangerous equipment, since at high speed it can cause more serious accidents to handlers. In addition to not having safety devices against accidents, once the rods of the meat are exposed, cleaning the teeth is rather difficult because they are secured and cannot be removed for washing; b) patent case No. PI0703235-8, filed on Sep. 19, 2007, describes a Meat Shredder that looks more like a mixer that operates similarly to a blender, whose shaft is vertical and provided with rods in cross, with two fixed teeth that hold the meat. The major problem is that this equipment mashes more than it distributes the meat, producing very small pieces of meat; and c) The third is an application for Utility Model No. MU9002621-7, a process referred to as Meat Shredder, comprising a motor coupled to a long, horizontal shaft, equipped with a conveying helicoid and shredding pins, with four shafts featuring rotary claws, which move in the opposite direction to shred the meat. It happens that all the shredding pins of the central shaft and the four claws are straight, and do not move the meat when shredding, providing large volume accumulation of meat shortly after the conveying helicoid.

In the USPTO patent database, case No. U.S. Pat. No. 4,199,840, published on Apr. 29, 1980, referred to as "Scarper blade structured for meat clean machine" consisting of two axes with gears that rotate in the opposite direction, passing through several discs with small flexible claws that could shred the meat; however, it is designed to clean the meat. The machine has a large number of components and holes that make it difficult to clean, and because it is a motorized equipment and with exposed gears, also poses a high risk of accidents to handlers.

In the ESPACENET patent base, several patent applications for meat processing machines for hamburger manufacturing were found; however, one draws attention to the model of the conveying shaft and the meat shredding, but it is not a specific machine to shred the product. This is the case No. SE9000255, filed in Japan by PCT/JP89/00818 on Aug. 13, 1988, referred to as "Method and device for continuous cutting, pulverization and mixing of frozen raw material", equipped with a cylindrical shaft of larger diameter at the beginning and smaller at the end, equipped with pieces of square bars welded diagonally in the cylindrical body and spaced by blades, capable of shredding, cutting and pressing the products put into the machine, so that they are not only shredded, but ground and mixed with other products added in the process.

It is important to point out that all the documents found in the state of the art, especially those found on the Brazilian database, since in Brazil a lot of shredded meat is used in the preparation of food, they are able to shred meats without crushing or grinding much of the product. The first and third equipment mentioned do not have safety devices for the operators in order to prevent access to the cutting parts of the machines. Brazilian case No. MU9002621-7 discloses an efficient machine for meat shredding, but its constructive structure is quite complex and expensive machine compared to the one applied for herein. All advantages of this utility model will be described below.

Therefore, faced with the difficulties encountered in the state of the art, the inventor developed the constructive arrangement applied to a cooked and/or precooked meat shredding machine which has great advantages in comparison to the equipment for shredding meat available in the market. Firstly, it is a simple, compact, modern and powerful equipment, capable of shredding up to 50 (fifty) kilograms of meat per minute. Its structure is simple as a compact worktop, with motor of the upper part covered by a fairing where the safety knob is very accessible, as well as control buttons (switch on/off). The shaft has a roller with cylindrical pins for tearing the meat, fixed in an imaginary helicoid line, allowing the portion of meat to be moved during processing, avoiding one-off effort due to the accumulation of product in a single roller location, as with the shredders described above. Another great novelty is the fact that the equipment claw is mounted on the side of the wall and outside the shredding chamber, which can easily be removed to clean the machine, which has no gaps or crevices that make it difficult to clean. This machine has a display window of the shredded meat without allowing direct access to the processed food, and a curved feed duct or with guards that prevent access by the operator's hand to the cutting parts of the machine when operating. In addition to the advantages described, its simple and compact construction allows to manufacture small or larger machines without changing the structure, in a practical and fast manner, with very affordable costs due to the simplicity of its components.

DESCRIPTION OF THE DRAWINGS

For a better understanding of this invention a detailed description of this is given below, with reference to the accompanying drawings, as follows.

DETAILED DESCRIPTION OF THE INVENTION

Figure 1:
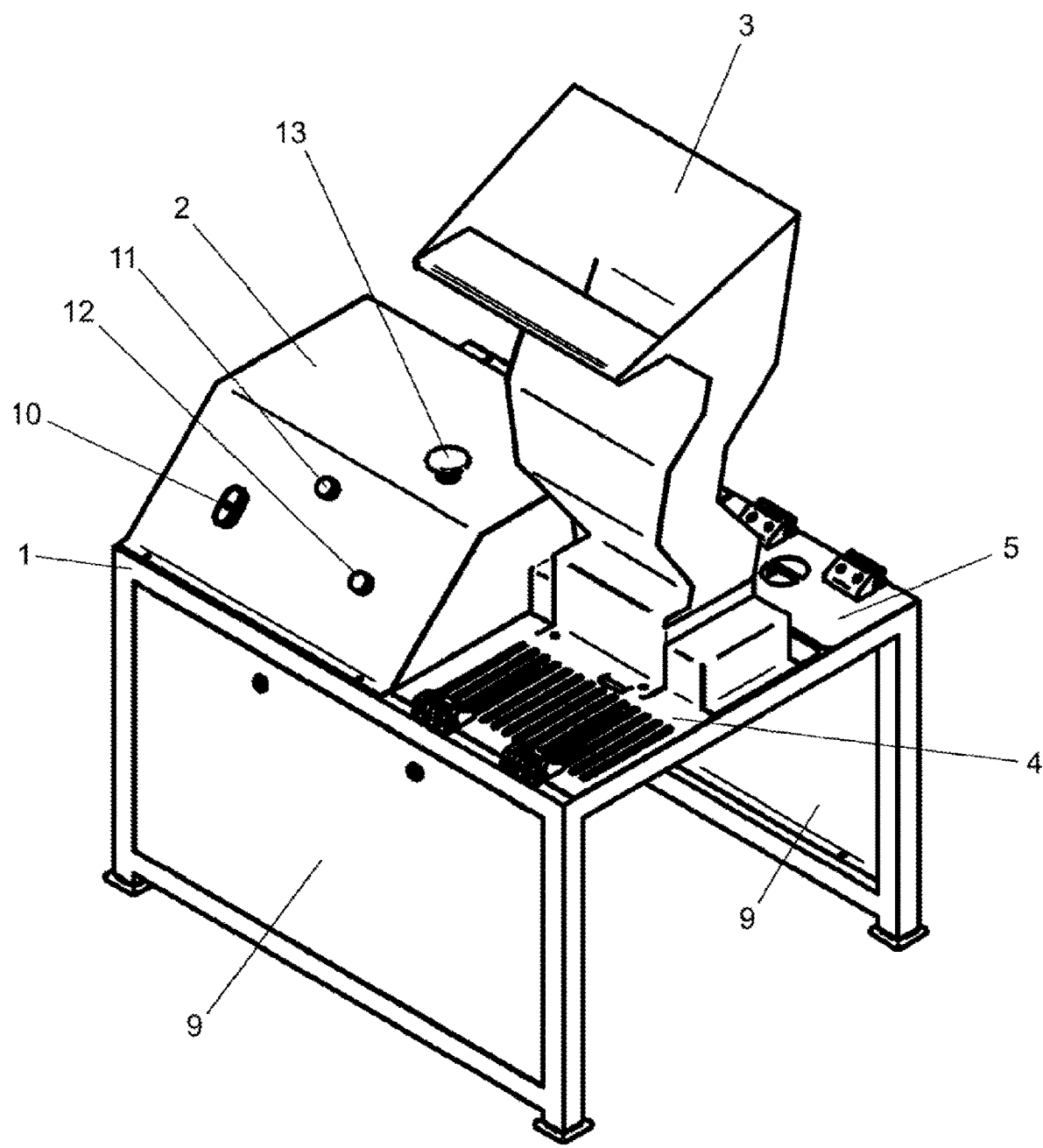
FIG. 01 represents a perspective view of this meat shredder.
Figure 2:
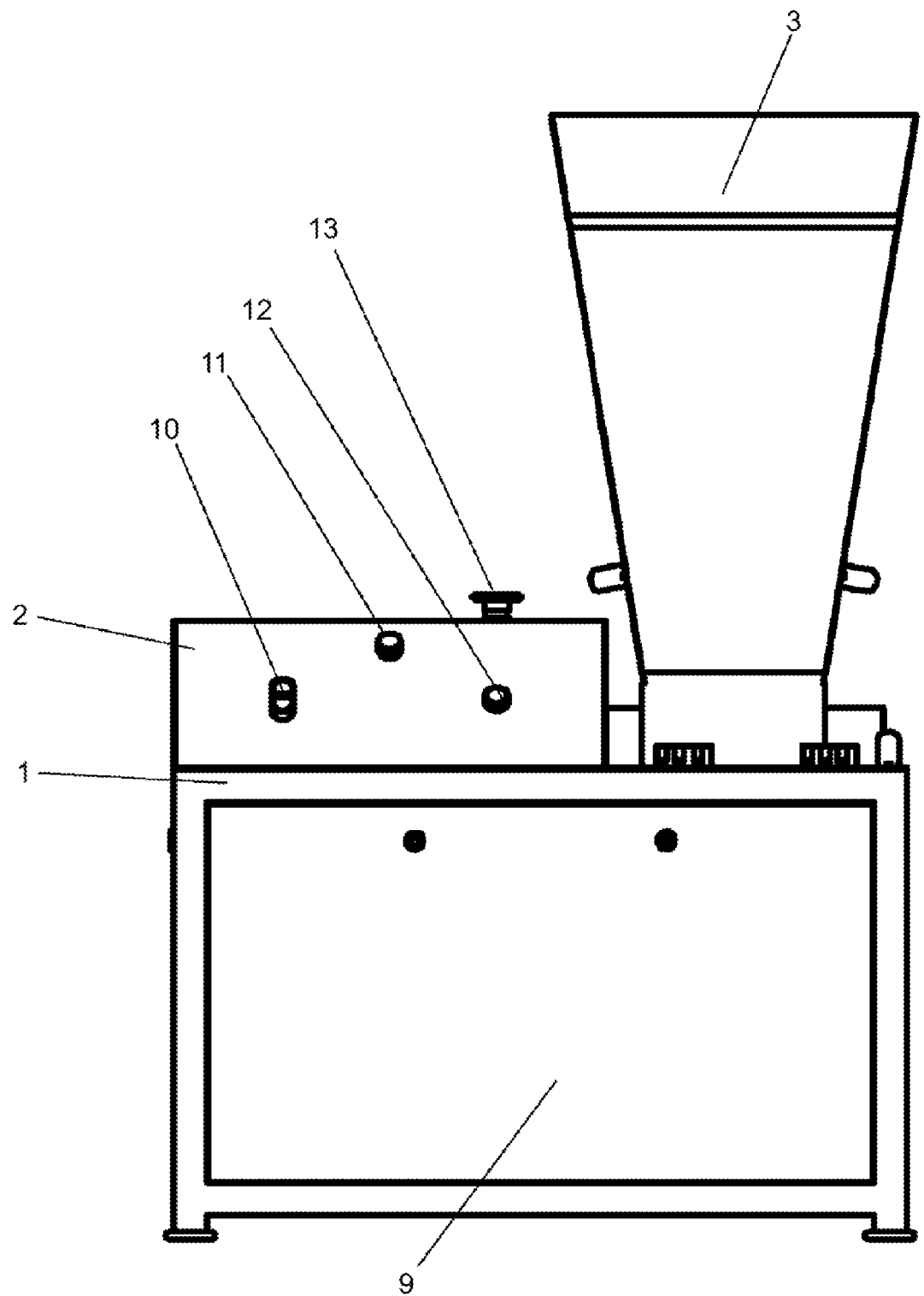
FIG. 02 represents a front view of the this meat shredder.
Figure 3:
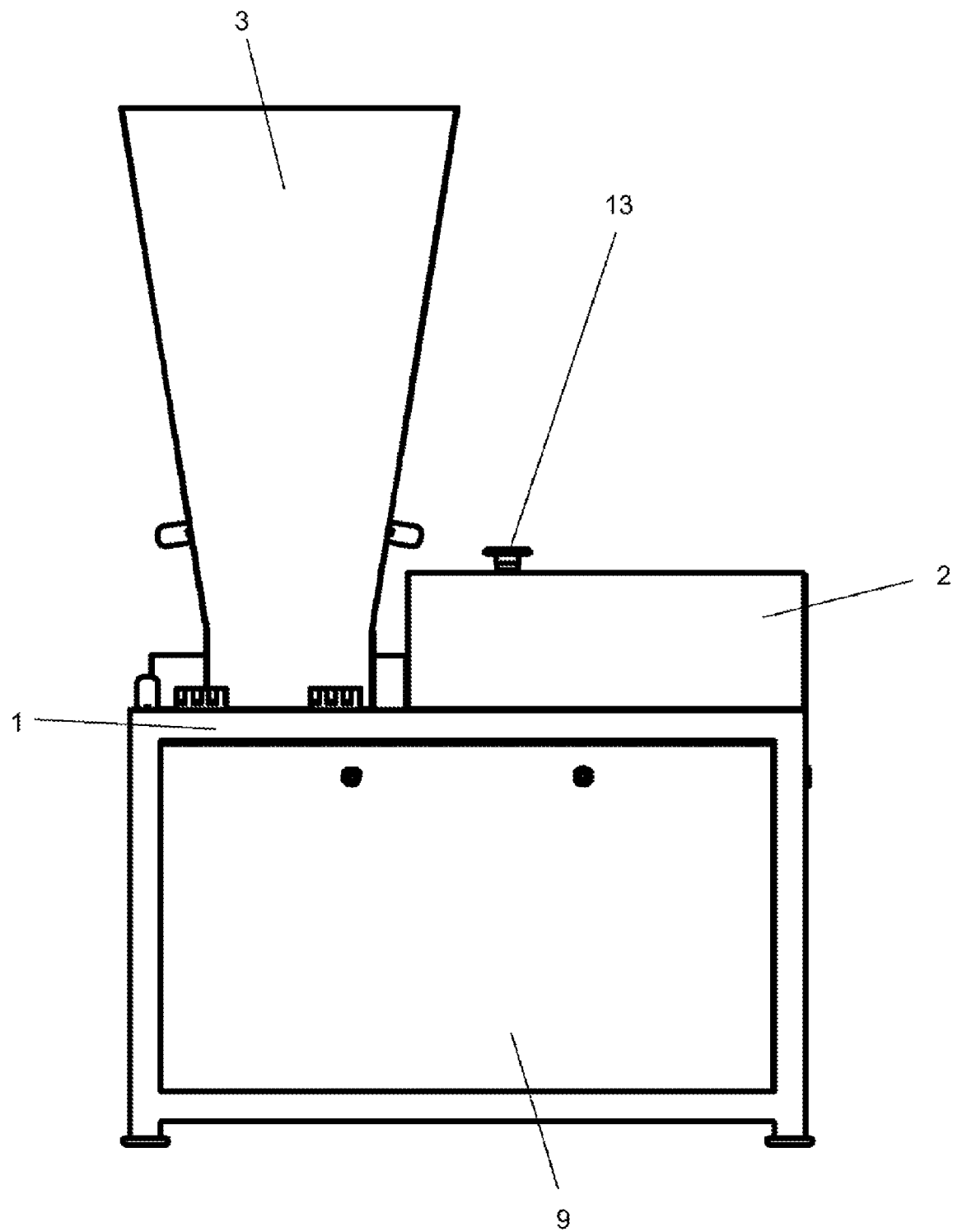
FIG. 03 is a rear view of the this meat shredder.
Figure 4:
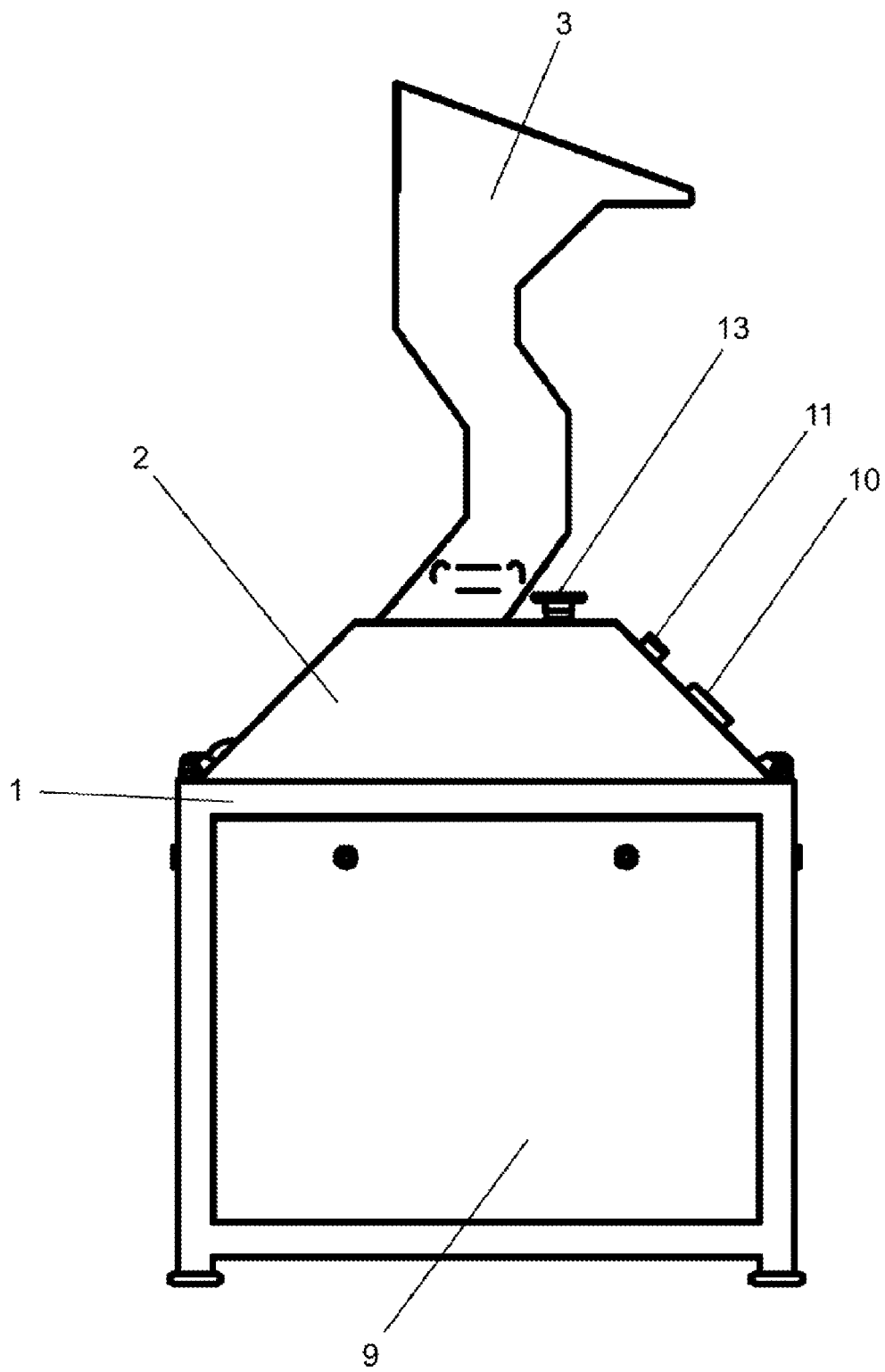
FIG. 04 is a side-left view of this meat shredder.
Figure 5:
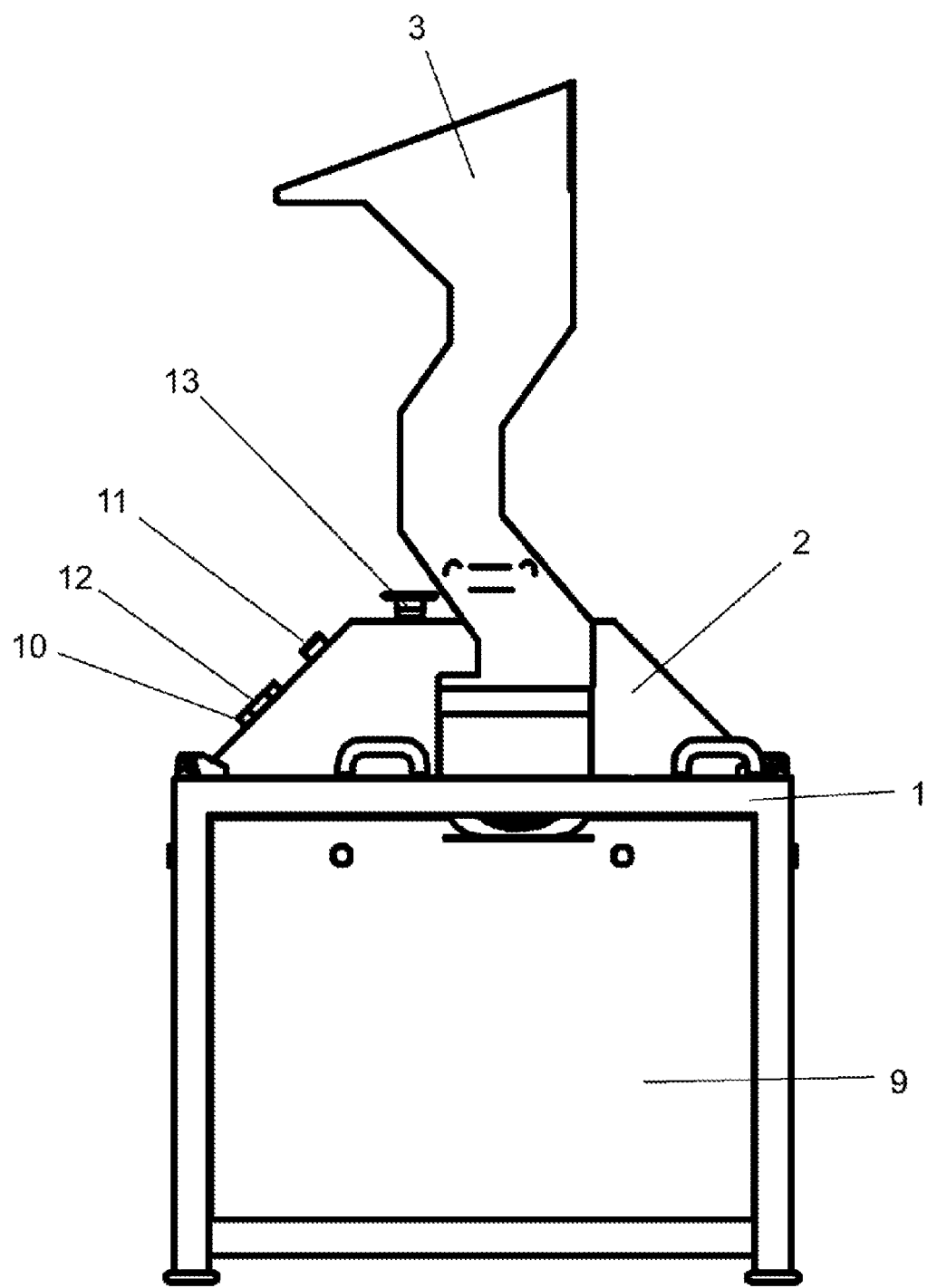
FIG. 05 is a side-right view of this meat shredder.
Figure 6:
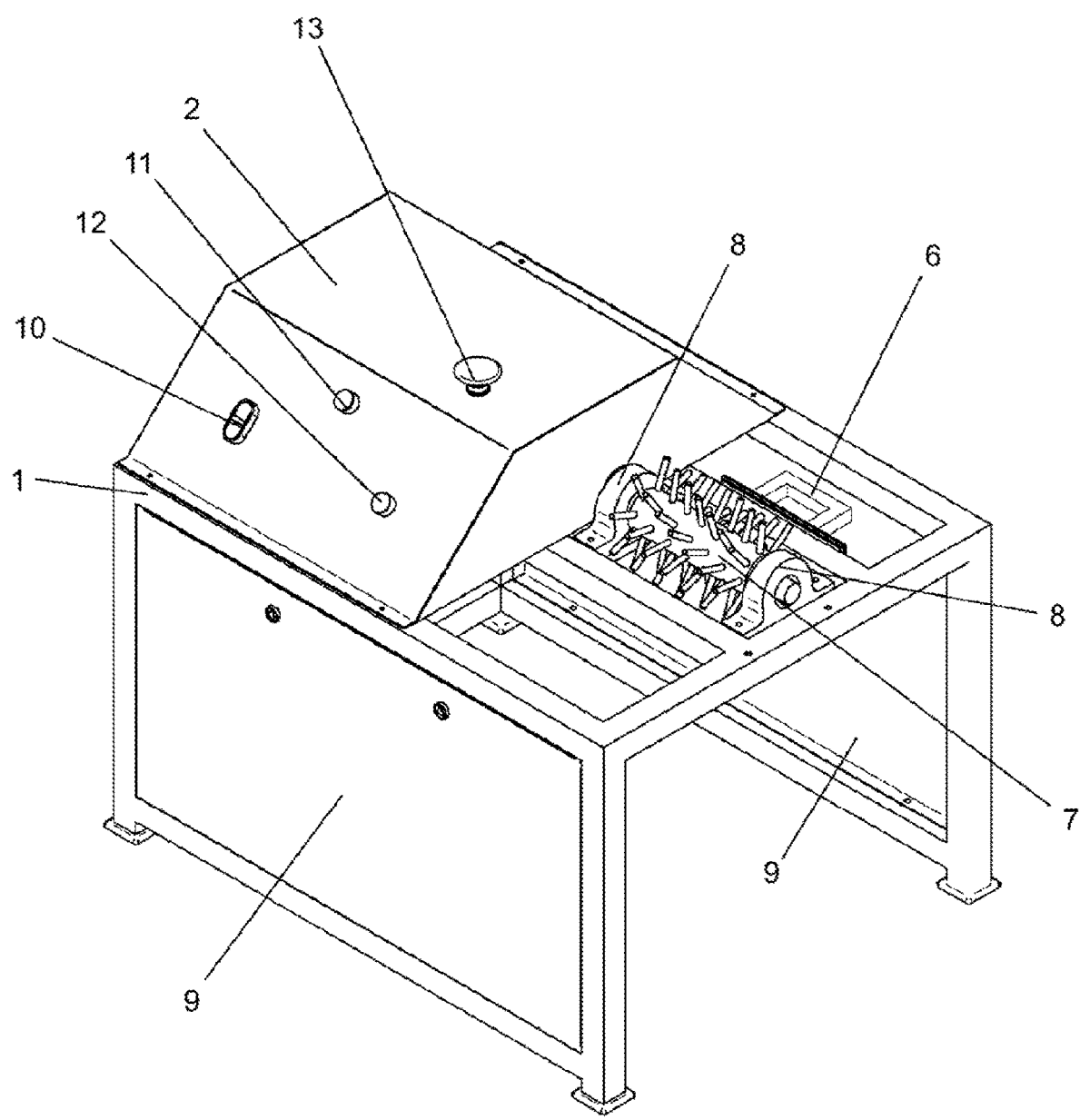
FIG. 06 is a perspective view of the equipment viewed from the front, with the shredding roller exposed.
Figure 7:
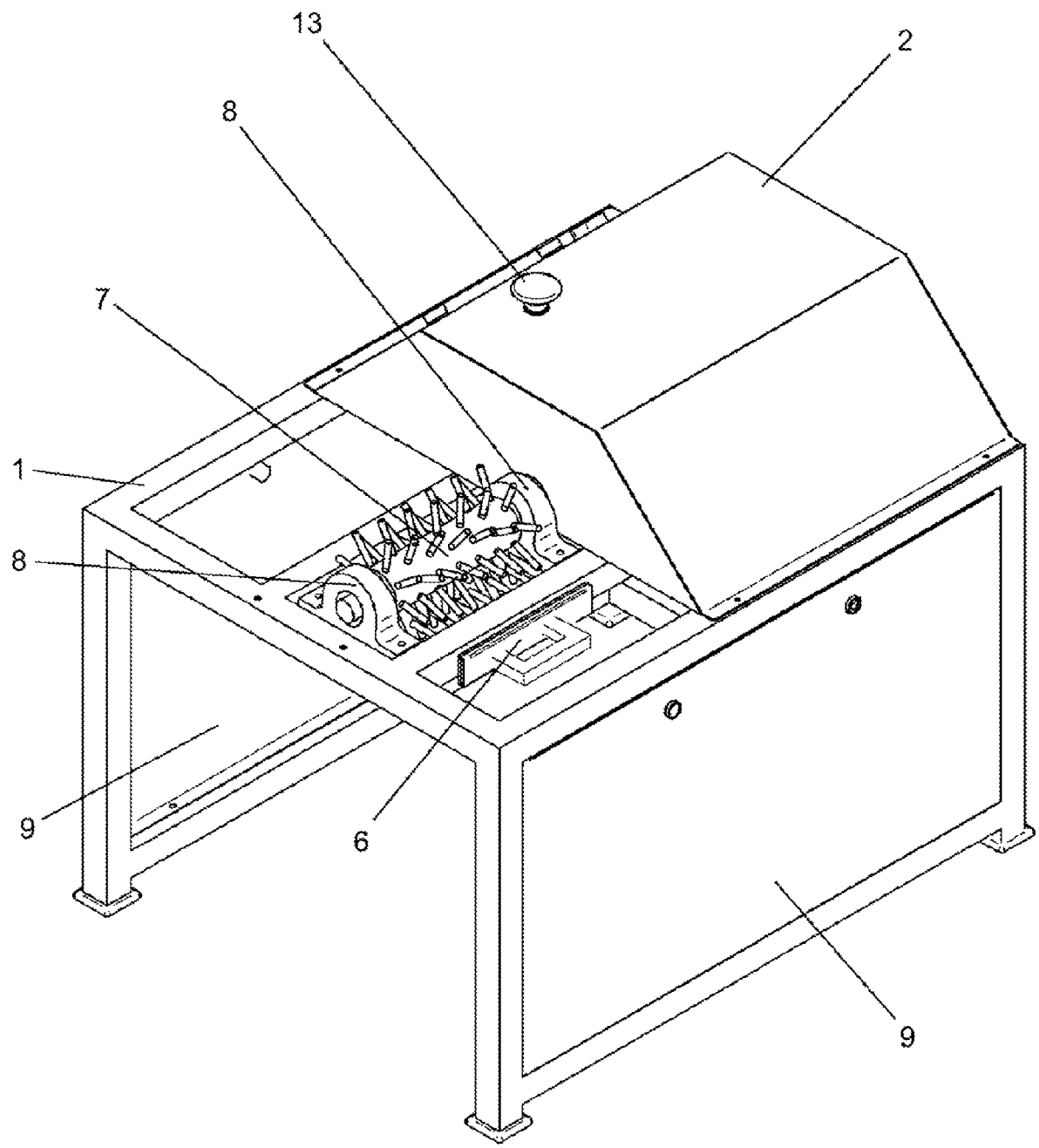
FIG. 07 is a perspective view of the equipment seen from the rear, with the shredder roller exposed.
Figure 8:
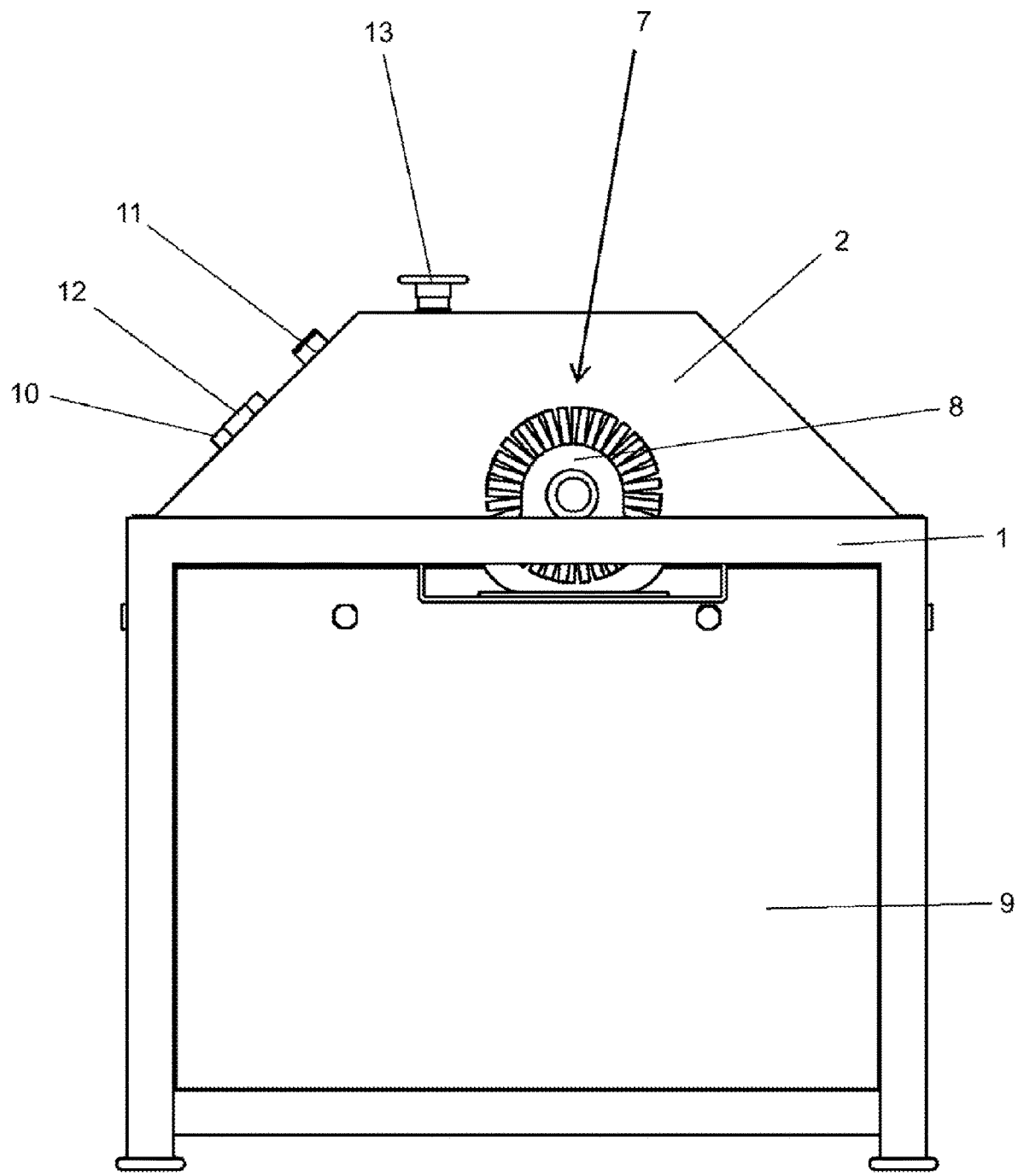
FIG. 08 is a side view of the equipment without the feed duct.
Figure 9:
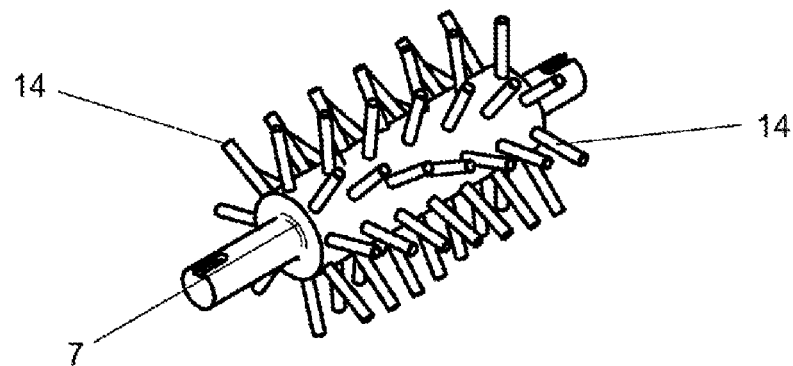
FIG. 09 is an isometric view of the shredder roller of the equipment.
Figure 10:
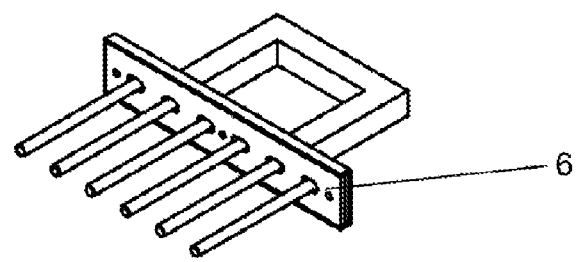
FIG. 10 is an isometric view of the shredding claw.
Figure 11:
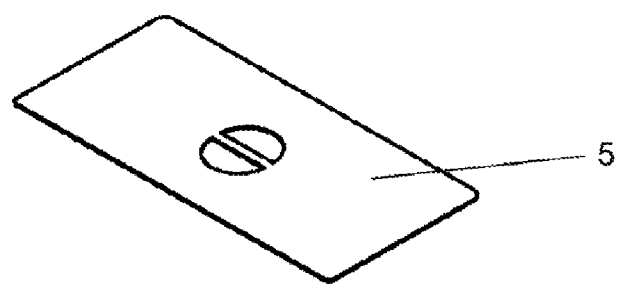
FIG. 11 is an isometric view of the inspection windows giving access to the shredder claw.
Figure 12:
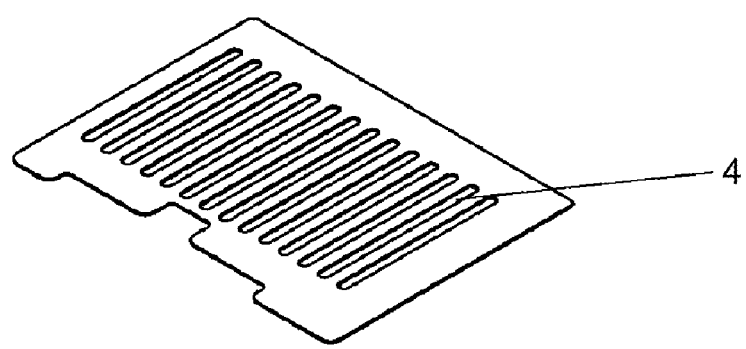
FIG. 12 is an isometric view of the display window of the processed product.
Figure 13:
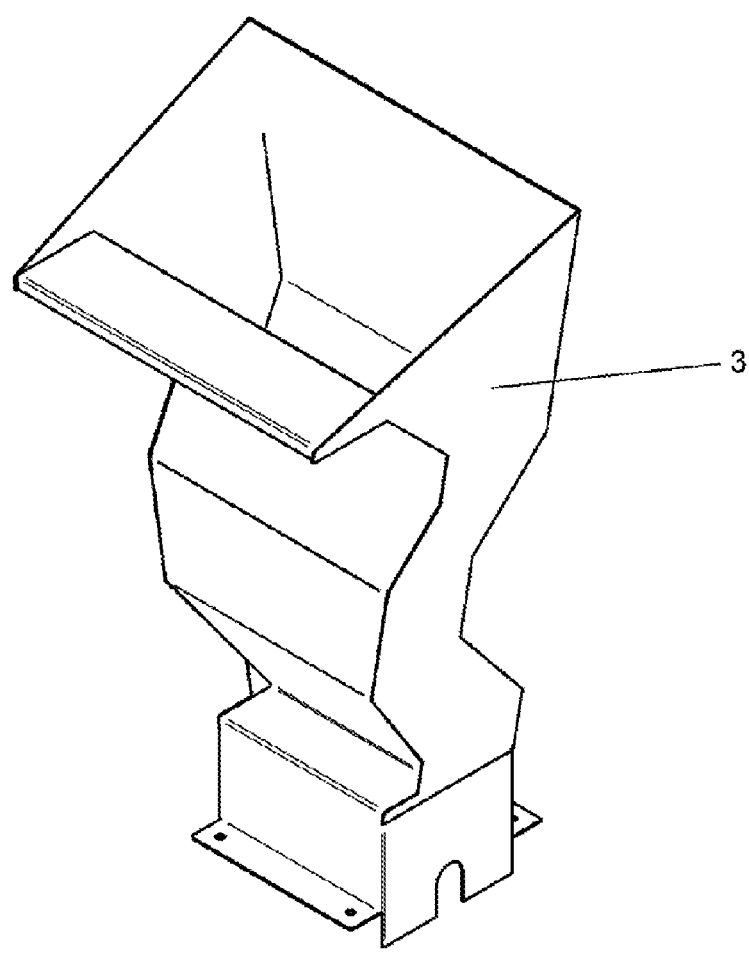
FIG. 13 is an isometric view of the long and curved feed duct.
Figure 14:
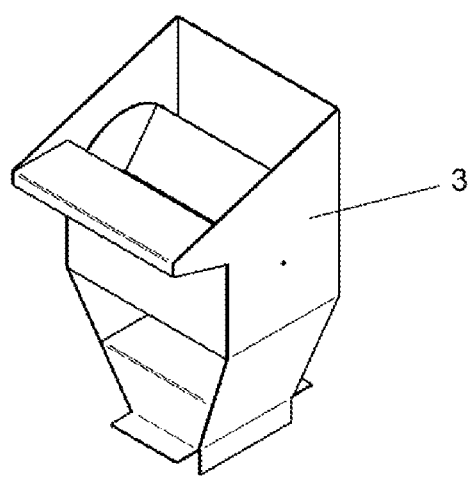
FIG. 14 is an isometric view of the short supply duct and with protective plates.

According to the illustrations in this report, we can see that the constructive arrangement applied in cooked and/or precooked meat shredding machine is worktop type equipment (1) of rectangular shape, with four feet, with motor and shaft mounted horizontally. In the upper part is the fairing (2) of the motor lock, the feed duct (3), the display window (4) of the processed product and the access window (5) to the claw (6) supporting the meat. The shredding roller (7) is mounted on two bearings (8) and coupled to the rotation transfer shaft of the motor.

The worktop (1) has a closing plate (9) on the front, left and rear sides. The right-hand side is open and does not have a lower crossbar so that you can enter a container with casters that collect the shredded meat.

The motor-closing fairing (2) has trapezoidal-shaped sides and is bolted to the worktop structure (1). It has the on/off button (10), an operating signal light (11), a reset button (12) and an emergency button (13) are installed.

The feed duct (3) is mounted on the equipment shredder chamber. It can be long with curved structure or short with protective plates to prevent the operator from putting his or her hand in any gap and have its arm injured by the rotating operation of the shredder roller (7) of the equipment. Even with all this care against accidents in the feed duct (3), the equipment still has the emergency button (13), previously mentioned.

The display window (4) mounted on hinges fixed to the upper part of the worktop (1), in front of the feed duct (3), serves to view the processed product without having to open any part of the equipment. It should only be opened for an easier cleaning of the shredder.

The access window (5) to the supporting (6) claw is completely closed, it is also installed in the upper part of the worktop (1), mounted on two hinges, behind the feed duct (3), and it is closed with a bolt.

The shredding roller (7) is a kind of roller filled with pins (14) of circular cross-section, fixed in its body and distributed in an imaginary helicoid line, forming multiple curved rows of pins (14), which pass between the teeth of the meat supporting claw (6). These rows of pins (14) allow the meat portion to be pushed forward during the rotational movement of the shredder roller (7).

The supporting claw of the portion (6) is made of stainless steel, having a bar provided with circularly-shaped pins of circular cross-section, with the holder on the other side of said steel bar, and is installed in through holes made in the rear portion of the product shredder chamber, these pins constituting the teeth of the claw (6).

The operation of the this meat shredder is quite efficient, it just requires the meat loaf to be cooked or precooked and placed, then the shredder collecting container is positioned, the equipment is turned on and the meat loaf is placed in the feeder (3). High-speed spinning moves the meat immediately, without grinding and without clogging. To clean the shredder, disconnect it from the mains socket, remove the power supply (3) and the display windows (4) of the processed and protective product (5) of the meat support claw (6) are opened. Then, just remove the claw (6) for washing, the feed duct (3), the shredder roller (7) and the walls of the shredding chamber are cleaned. Finally, the components the equipment will be assembled again, which will be ready for use.

It should be noted that the feed duct (3) has special walls and cuts engaged to the shaft of the shredder roller (7), coating the bearings (8) to avoid accumulation of processed product in places of difficult cleaning.

The short feed duct (3) is engaged to the same fixing base of the long duct, facilitating the manufacturing process and keeping the structures easy to clean. It has sloped plates welded on the front and rear walls of the duct, fixed and positioned with mismatched heights, with a space allowing the passage of the meat portion and preventing the operator's hands from passing the equipment.

The invention claimed is:

1. Constructive arrangement applied to a cooked and/or precooked meat shredding machine to shred various meats, cooked and/or pre-cooked, deboned, either from ox, chicken or other animals, characterized by:
   a) a (1) four-piece rectangular-shaped worktop (1) with a motor and shaft mounted horizontally, a motor closing fairing (2) bolted on the upper part of the worktop (1) in four points, the fairing (2) with trapezoidal sides, on/off buttons (10), operation signal light (11) reset button (12) on the front and an emergency button (13) on the top of the fairing (2);
   b) a feed duct (3) being mounted on the equipment shredder chamber, having a curved and long structure, with walls and special cuts in the lower part that is engaged to the shaft of the shredder roller (7) and covers the bearings (8);
   c) the display window (4) of the processed product is installed in the front part of the worktop (1), mounted on hinges between the base of the feed duct (3) and the upper crossbar of the shredder frame, and it is closed with bolts;
   d) the access window (5) to the meat support claw (6) is mounted behind the feeder (3), has two hinges and also has bolt closure;
   e) the shredder roller (7) is a kind of roller full of pins (14) of circular cross-section, fixed in its body and distributed in an imaginary helicoid line, forming several curved rows of pins (14), is mounted on two bearings (8) and coupled on the shaft of rotation transfer of the motor;
   f) the support claw (6) of the meat portion is made of stainless steel, comprising a bar provided with pins of circular section fixed in a straight line, with the holder on the other side of said steel bar, and is installed in through holes made in the rear part of the product shredder chamber, and these pins are the teeth of the claw.

2. Constructive arrangement applied to a cooked and/or precooked meat shredding machine, according to claim 1, characterized by the short feed duct (3) having inclined plates welded to the front and rear walls of the duct, fixed and positioned with mismatched heights, with a space preventing the operator's hands from passing the equipment.

* * * * *